United States Patent
Chin et al.

(10) Patent No.: US 11,381,511 B2
(45) Date of Patent: Jul. 5, 2022

(54) ACCELERATING SATELLITE ACCESS WITH LOW LATENCY DIVERSITY TRANSPORT

(71) Applicants: Michael Chin, San Diego, CA (US); Douglas Dillon, Rockville, MD (US); Sampath Ramaswami, Gaithersburg, MD (US)

(72) Inventors: Michael Chin, San Diego, CA (US); Douglas Dillon, Rockville, MD (US); Sampath Ramaswami, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/018,599

(22) Filed: Sep. 11, 2020

(65) Prior Publication Data

US 2021/0083983 A1    Mar. 18, 2021

Related U.S. Application Data

(60) Provisional application No. 62/902,153, filed on Sep. 18, 2019.

(51) Int. Cl.
*H04W 56/00* (2009.01)
*H04L 47/2441* (2022.01)
(Continued)

(52) U.S. Cl.
CPC ......... *H04L 47/2441* (2013.01); *H04B 7/185* (2013.01); *H04L 12/2854* (2013.01);
(Continued)

(58) Field of Classification Search
CPC ............. H04L 47/2441; H04L 12/2854; H04L 12/4633; H04L 12/4641; H04L 63/0272; H04L 63/029; H04L 69/324; H04B 7/185
(Continued)

(56) References Cited

U.S. PATENT DOCUMENTS

| | | | |
|---|---|---|---|
| 10,348,394 B1* | 7/2019 | Bakr | H04B 7/0408 |
| 2017/0155590 A1* | 6/2017 | Dillon | H04L 41/5025 |
| 2018/0167987 A1* | 6/2018 | Sung | H04W 28/0215 |

OTHER PUBLICATIONS

Hong Se Gi et al: "ASAP: Fast, Controllable, and Deployable Multiple Networking System for Satellite Networks", 2015 IEEE Global Communications Conference (Globecom), IEEE, Dec. 6, 2015 (Dec. 6, 2015), pp. 1-7, XP032872207,DOI: 10.1109/GLOCOM.2014.7417041 [retrieved on Feb. 23, 2016].
(Continued)

*Primary Examiner* — Sai Ming Chan
(74) *Attorney, Agent, or Firm* — Capitol City TechLaw; Jason Singh

(57) ABSTRACT

An accelerator and system to provide a combined transport Wide-Area Network (WAN) transports. The accelerator includes a tunnel manager to maintain tunnels traversing each of the WAN transports; an inspector to perform packet and IP flow classification to set a respective classification metric for a downstream packet to be sent over the combined transport; a transport selector to select a preferred tunnel from the tunnels based on the respective classification metric of the downstream packet; and a sender to send the downstream packet over the preferred tunnel. In the accelerator, the WAN transports include a high latency satellite transport and a low latency transport, and a respective tunnel connects the accelerator to a peer accelerator via one of the WAN transports. The accelerator includes a receiver to receive upstream packets arriving over the combined transport and to forward the upstream packets to a user equipment.

18 Claims, 3 Drawing Sheets

(51) Int. Cl.
     *H04B 7/185*       (2006.01)
     *H04L 12/28*       (2006.01)
     *H04L 12/46*       (2006.01)
     *H04L 9/40*        (2022.01)
     *H04L 69/324*     (2022.01)

(52) U.S. Cl.
     CPC ...... *H04L 12/4633* (2013.01); *H04L 12/4641* (2013.01); *H04L 63/029* (2013.01); *H04L 63/0272* (2013.01); *H04L 69/324* (2013.01)

(58) Field of Classification Search
     USPC .......................................................... 370/316
     See application file for complete search history.

(56) References Cited

OTHER PUBLICATIONS

International search report for PCT/US2020/050470 dated Nov. 26, 2020.

\* cited by examiner

ACCELERATING SATELLITE ACCESS WITH LOW LATENCY DIVERSITY TRANSPORT

CROSS-REFERENCE TO RELATED APPLICATIONS AND INCORPORATION BY REFERENCE

The present application claims the benefit under 35 U.S.C. 119(e) of U.S. Provisional Application Ser. No. 62/902,153, filed Sep. 18, 2019, which is incorporated herein by reference in its entirety.

FIELD

A system and method for leveraging a lower latency, lower throughput transport like a wireless cellular network in conjunction with high throughput, higher latency satellite to create a combined transport for an end user which is low latency, high throughput and has redundancy. This system includes an accelerator, two or more Wide Area Networks (WANs) internet transports including a high latency, high throughput satellite transport and a low latency transport, and a peer accelerator at a Point of Presence (PoP).

BACKGROUND

High Throughput Satellite (HTS) systems are capable of delivering over 200 Mbps throughput from a ground station to end user terminal; however, the minimum packet round trip latency for a geosynchronous satellite system is at least 480 milliseconds. Despite the high availability, broad coverage, and high throughput, secure webpage and highly interactive traffic load times over satellite tends to be longer compared to lower throughput, lower latency terrestrial systems due to the long round trip delay over satellite and the number of round-trip connections needed in modern end user applications.

In basic multiple transport implementations, routers have fixed routes and load balancing for traffic. When traffic switches over, existing connections are cut and need to be re-established as the IP path routing has changed. Also, user traffic does not take advantage of both transports and their relative benefits.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings use an accelerator, two or more Wide Area Networks (WANs) including a high throughput, high latency satellite transport and a low latency transport, and a peer accelerator.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an accelerator to provide a combined transport combining Wide-Area Network (WAN) transports. The accelerator includes a tunnel manager to maintain tunnels traversing each of the WAN transports; an inspector to perform packet and IP flow classification to set a respective classification metric for a downstream packet to be sent over the combined transport; a transport selector to select a preferred tunnel from the tunnels based on the respective classification metric of the downstream packet; and a sender to send the downstream packet over the preferred tunnel. In the accelerator, the WAN transports include a high latency satellite transport and a low latency transport, and a respective tunnel connects the accelerator to a peer accelerator via one of the WAN transports. Other embodiments of this aspect include corresponding computer systems, apparatus, and computer programs recorded on one or more computer storage devices, each configured to perform the actions of the methods.

Implementations may include one or more of the following features. The accelerator may include a receiver to receive upstream packets arriving over the combined transport and to forward the upstream packets to a user equipment. The receiver may restore an order of the upstream packets when the upstream packets for an Internet Protocol (IP) flow are received out of order.

In some embodiments, the transport selector selects a plurality of the tunnels as the preferred tunnel when the respective classification metric indicates critical application traffic, the sender sends duplicates of the downstream packet over each of the preferred tunnel, and the peer accelerator uses only a first to arrive of the duplicates of the downstream packet. In some embodiments, the accelerator selects, from the tunnels, a tunnel associated with the low latency transport as the preferred tunnel when the respective classification metric indicates interactive traffic and selects, from the tunnels, a tunnel associated with the high latency satellite transport as the preferred tunnel when the respective classification metric indicates bulky traffic. In some embodiments, the accelerator selects, from the tunnels, a tunnel associated with the low latency transport as the preferred tunnel when the respective classification metric indicates a start-up of a secure web-browsing session. In some embodiments, the accelerator selects, from the tunnels, a tunnel associated with the low latency transport as the preferred tunnel when the respective classification metric indicates a start-up period of bulky traffic, and selects from the tunnels, a tunnel associated with the high latency satellite transport as the preferred tunnel when the respective classification metric indicates post the start-up period, where the start-up period is set to be less than or equal to a round-trip time over the high latency satellite transport. In some embodiments, the accelerator selects, from the tunnels, a tunnel associated with the high latency satellite transport as the preferred tunnel when the respective classification metric indicates a high quality of service requirement and selects, from the tunnels, a tunnel associated with the low latency transport as the preferred tunnel when the respective classification metric indicates real-time traffic.

In some embodiments, the accelerator monitors availability of the peer accelerator and updates the combined transport to maintain and use an alternative tunnel to an alternative peer accelerator. The downstream packet may include downstream packets and the inspector performs packet and IP flow classification on each of the downstream packets. The accelerator may include a Performance Enhancing Proxy (PEP) splitter to terminate an IP flow's original protocol.

One general aspect includes a system to provide a combined transport combining WAN transports. The system includes an accelerator including a tunnel manager to maintain tunnels traversing each of the WAN transports, an inspector to perform packet and IP flow classification to set a respective classification metric for a downstream packet to be sent over the combined transport, a transport selector to select a preferred tunnel from the tunnels based on the respective classification metric of the downstream packet, and a sender to send the downstream packet over the preferred tunnel. The system also includes a peer accelerator that is an instantiation of the accelerator. In the system, the WAN transports may include a high latency satellite transport and a low latency transport, and a respective tunnel connects the accelerator to the peer accelerator via one of the WAN transports. Other embodiments of this aspect include corresponding computer systems, apparatus, and computer programs recorded on one or more computer storage devices, each configured to perform the actions of the methods.

Implementations may include one or more of the following features. In some embodiments, the system includes a Customer Premises Equipment (CPE) including the accelerator connected to a public internet via the peer accelerator. In some embodiments, the system may include a CPE including a satellite modem to provide the high latency satellite transport, a cellular modem to provide the low latency transport, and the accelerator. In some embodiments, the system may include a point of presence including the peer accelerator connected to a public internet. In some embodiments, the system may include a management network including a VPN firewall, a database to store configuration data and logs, an EMS and a service. Implementations of the described techniques may include hardware, a method or process, or computer software on a computer-accessible medium.

In some embodiments, the accelerator selects, from the tunnels, a tunnel associated with the low latency transport as the preferred tunnel when the respective classification metric indicates a start-up period of bulky traffic, and selects from the tunnels, a tunnel associated with the high latency satellite transport as the preferred tunnel when the respective classification metric indicates post the start-up period, where the start-up period is set to be less than or equal to a round-trip time over the high latency satellite transport. In some embodiments, the high latency satellite transport may include multiple high latency satellite transports and the transport selector selects the preferred tunnel to increase redundancy, improve quality of service, and/or increased combined bandwidth. Implementations of the described techniques may include hardware, a method or process, or computer software on a computer-accessible medium.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
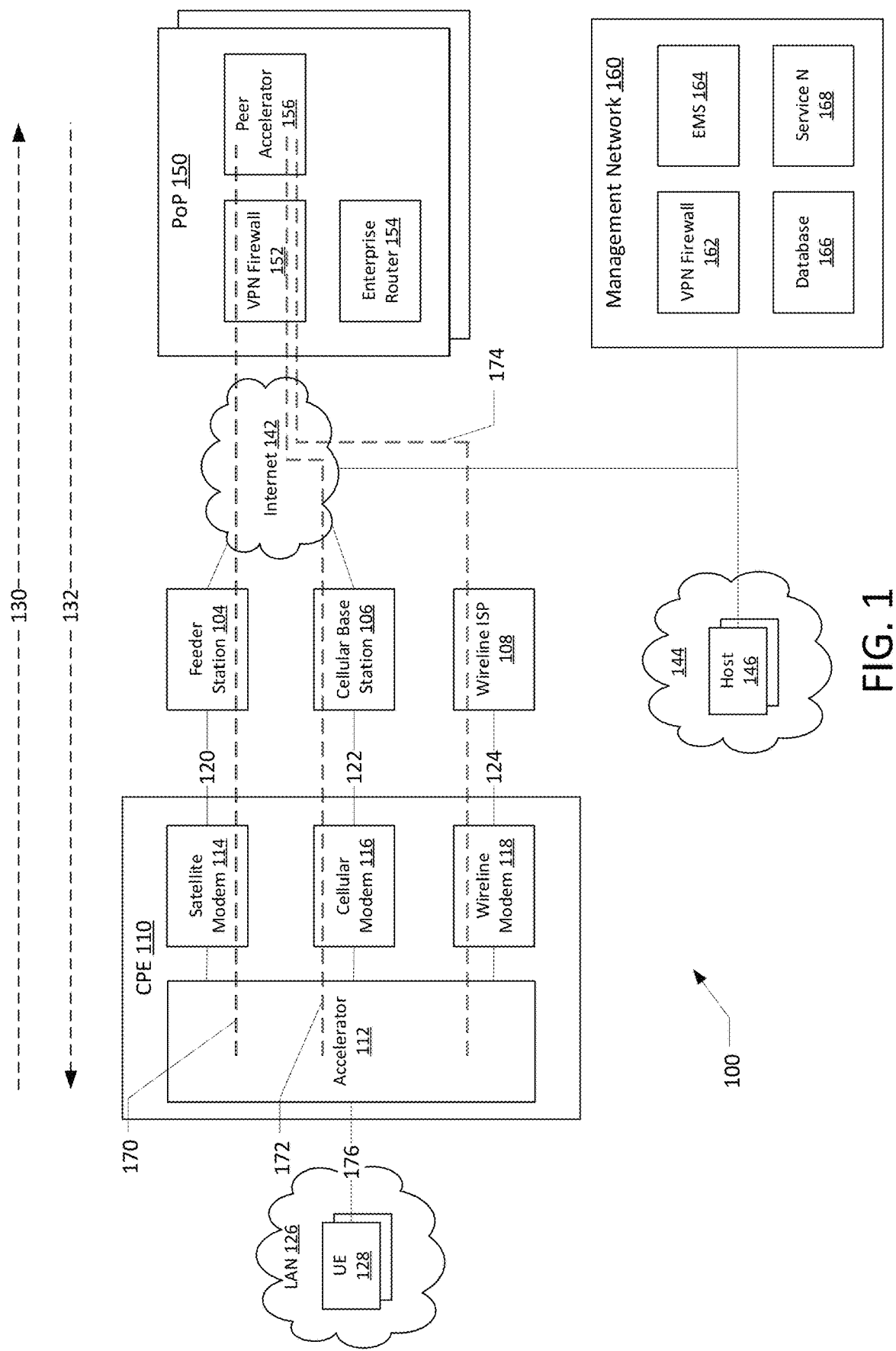
FIG. 1 illustrates a combined low-latency high throughput system, according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings are directed to leveraging a lower latency, lower throughput terrestrial transport like a wireless cellular network in conjunction with higher throughput, higher latency satellite to create a combined end user low latency and high throughput transport.

The present teachings may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the tunnel may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Introduction

A high-bandwidth satellite system has significant advantages including high throughput, a satellite capable of 100+ Gbps switch capability, end user terminals of speeds upwards of 200+ Mbps, and large coverage. Furthermore, only three (3) geosynchronous satellites can cover the majority of the entire planet while using reduced ground infrastructure compared to an alternative network of similar coverage. However, high altitude orbiting like geosynchronous orbiting satellite systems suffer from one key disadvantage, namely, latency. Propagation delay to a geosynchronous orbiting satellite at 35,768 km above the earth is a minimum of 480 ms. The propagation delay can be problematic for interactive traffic and secure web-browsing requiring multiple round trips, resulting in long access and load times.

Alternate communication systems, for example, cellular and wireline, have the opposite concern. Alternate communication systems generally have low latency, as low as a few milliseconds, to an internet gateway. While capable of very high bandwidth 1000+ Mbps to the end consumer, alternate communication systems suffer from capacity limitation and congestion in urban, suburban, and rural areas. Moreover, significant ground infrastructure is needed for service coverage and not all customers can be serviced with equal quality of service. Moreover, guaranteed quality of service is extremely expensive and not affordable for the typical underserved consumer with alternate communication systems.

To consider a low latency transport for diversity and acceleration, the low latency transport has a lower average round trip when compared to the high latency satellite transport. And the larger the difference in latency, the greater the benefit of using the low latency transport to accelerate the high latency satellite transport. For example, the disparity between a GEO transport (~480 ms RTT) and a 4G cellular (~40-150 ms RTT) is very significant. In exemplary embodiments, disparity between high latency transports and low latency transports is about 100 ms or greater, or about 200 ms or greater.

By supplementing a high latency satellite system with a low latency diversity transport, a combined optimized and redundant transport benefiting from high throughput, high availability and low latency is achieved. To achieve this, the present teachings disclose integration of two disparate communication systems for a seamless and fast transport service. A subscriber, a user equipment or an application are unaware that their packets are traversing more than one transport and perceives the characteristics of the combined transport only. Without the integration, standalone high latency satellite and alternate transport service exhibits a poor user experience.

FIG. 1 illustrates a combined low-latency high throughput system, according to various embodiments.

A combined low latency high throughput system 100 may combine a high-latency high-throughput transport like a satellite transport 120 with a low-latency low-throughput transport like a cellular transport 122 or a wireline transport 124 to provide networks services to a subscriber. A subscriber's UE 128 may be disposed on a LAN 126. A Customer Premises Equipment (CPE) 110 may be connected to the LAN 126. The UE 128 may request services from a host 146 connected to a private LAN 144. The host 146 and private LAN 144 may be reachable via the public Internet 142. The system 100 may include a Point of Presence (PoP)150. The system 100 may include a management network 160.

The CPE 110 may include an accelerator 112, a satellite modem 114, a cellular modem 116 and a wireline modem 118. The accelerator 112 may be connected to the LAN 126 that provides connectivity to the UE 128. The satellite modem 114 provides the satellite transport 120. The cellular modem 116 provides the cellular transport 122. The wireline modem 118 provides the wireline transport 124. In some embodiments, only one of the cellular transport 122 or the wireline transport 124 are provided. The cellular transport 122 or the wireline transport 124, singly or in combination, may provide the low latency transport. In some embodiments, a wireless transport (not shown) may be provided as a low latency transport. The accelerator 112 may concurrently use one or more of the satellite transport 120, the cellular transport 122 or the wireline transport 124. The satellite modem 114 may connect to a feeder station 104 via a satellite (not shown) to access the satellite transport 120. The cellular modem 116 may connect to a cellular base station 106 to access the cellular transport 122. The wireline modem 118 may connect to a wireline ISP 108 to access the wireline transport 124. The feeder station 104, the cellular base station 106 and the wireline ISP 108 may be connected to the public Internet 142.

The feeder station 104, the cellular base station 106 and the wireline ISP 108 may use the public Internet 142 to communicate with a PoP 150. In some embodiments the PoP 150 may be co-located with one or more of the feeder station 104, the cellular base station 106 and the wireline ISP 108 and as such traffic to the PoP 150 need not traverse the public Internet 142. The PoP 150 may optionally include a Virtual Private Network (VPN) firewall 152, an enterprise router 154 and a peer accelerator 156. The enterprise router 154 may connect the peer accelerator 156 to a host 146 optionally via a private LAN 144. All traffic to and from the PoP 150, and in particular the peer accelerator 156, may traverse the VPN firewall 152. The management network 160 may include a VPN firewall 162, an EMS 164, a database 166 and a service 168.

The accelerator 112 connects to the peer accelerator 156 via each of the WAN transports (120, 122, 124) available, for example, a peer to peer tunnel 170 (satellite tunnel) via the satellite transport 120, a peer to peer tunnel 172 (low latency tunnel) via the cellular transport 122, and a peer to peer tunnel 174 (low latency tunnel) via the wireline transport 124. The peer to peer tunnels 170, 172, 174 may be simplex (conveying packets in only one direction) or duplex (conveying packets in both directions). The accelerator 112 provides a combined transport 176 usable by a UE 128 of the LAN 126. The accelerator 112 may use the combined transport 176 to communicate with the host 146 using one or more of the peer to peer tunnels. The selection of the peer to peer tunnel and by extension the corresponding transport to transport a packet is based on increasing throughput and decreasing latency after a packet's inspection as described herein. Similar to the accelerator 112, the peer accelerator 156 presents a combined transport (not shown) to the host 146. The combined transport from the peer accelerator 156 to the accelerator 112 combines the peer to peer tunnels 170, 172, 174 to increase packet transport throughput and decrease latency after a packet inspection at the peer accelerator 156. In some embodiments, each of the peer to peer tunnels 170, 172, 174 may span multiple transports, for example, multiple satellite transport connections or multiple cellular transport connections. The multiple transports may be used to further segregate the network traffic, for example, one transport per priority level, per QoS level, or the like.

The accelerator 112 and peer accelerator 156 transport a packet by performing IP flow inspection and classification of the packet; performance monitoring of the WAN transports (120, 122, 124); managing peer-to-peer tunnels 170, 172, 174; availability of a PoP 150 hosting the peer accelerator 156; and routing the packet using a preferred transport selected from the satellite transport 120, the cellular transport 122 or the wireline transport 124. In some embodiments, the peer-to-peer tunnels 170, 172, 174 may use an unsecure or secure tunnel over the public Internet 142. In some embodiments, the peer-to-peer tunnels 170, 172, 174 may use communication tunnels established between the CPE 110 hosting the accelerator 112 and the PoP 150 hosting the peer accelerator 156 using tunneling protocols such as GRE, IPSec, L2TP, SSL or the like. The tunnels may be provided a VPN firewall (not shown) at the CPE 110 and the optional VPN firewall 152 of the PoP 150.

Network traffic from the UE 128 to the host 146 is treated as upstream traffic 130 and is received by the accelerator 112 via the combined transport 176. The accelerator 112 sends the downstream traffic 130 via the one or more peer-to-peer tunnels 170, 172, 174 to the peer accelerator 156 for delivery to the host 146.

Network traffic from the host 146 to the UE 128 is treated as downstream traffic 132 and is received by the peer accelerator 156 via from the host 146. The peer accelerator 156 sends the upstream traffic 132 via the one or more peer-to-peer tunnels 170, 172, 174 to the accelerator 112 for delivery to the UE 128 via the combined transport 176.

Multiple types of redundant connectivity and scalability may be achieved. For example, the first type of redundant connectivity and scalability is provided by the availability of multiple transports between the CPE 110 and the PoP 150. With the multiple transports, the accelerator may transmit packets from the same IP flow over more than one transport (back to back or in parallel) to increase redundancy. However, due to the varying latencies of the transports, packets arrive at different times at the receiving peer. The accelerator peer may restore the order of the packets and discard duplicates as needed.

A second type of redundant connectivity and scalability may be achieved through the availability of multiple PoPs 150 where the acceleration client 12 may automatically handoff between the PoPs 150 in case of a PoP outage, peer gateway outage, congestion or the like. The PoPs 150 may be instantiated on physical, virtual, or cloud-based hardware. The CPE 110 may be a single or multiple component solution including the accelerator 112, a tunneling client (for example a VPN firewall, not shown), and transport modems including the satellite modem 114, the cellular modem 116 and the wireline modem 118.

Accelerators

To integrate standalone high latency satellite and low latency transport networks, the present teachings disclose an accelerator and a peer accelerator. The accelerator and the peer accelerator may be mirror devices and processing occurring in the accelerator also occurs in the peer accelerator. The accelerator and peer accelerator are network peers. In the present teachings, traffic between a user device and a host is conveyed through tunnels established between the accelerator and the peer accelerator.

These two peer accelerators establish a peer-to-peer tunnel over each WAN transport to form a private acceleration network or combined transport. At least one of the accelerator or the peer accelerator may be hosted by a PoP. The accelerators may use one or more custom or standard tunneling protocols like GRE, IPSec, SSL, L2TP, etc. for the tunnels. Selected tunneling protocol may depend on criteria like security, overhead, and reliability. Multiple peer tunnels between two endpoints may be used to create redundancy and allow packets over either tunnel. Packet routing can select between the WAN transports to route user traffic based on associated transport characteristics and packet QoS without end user impact. At least a portion of the two types of accelerators may be in common in its implementation, for example, the accelerator of FIG. 2. In some embodiments, the peer accelerator may be a gateway, for example an accelerator gateway that is more scalable than an accelerator. The accelerator gateway may be deployed at a feeder station, cellular base station, a PoP or the like.

Figure 2:
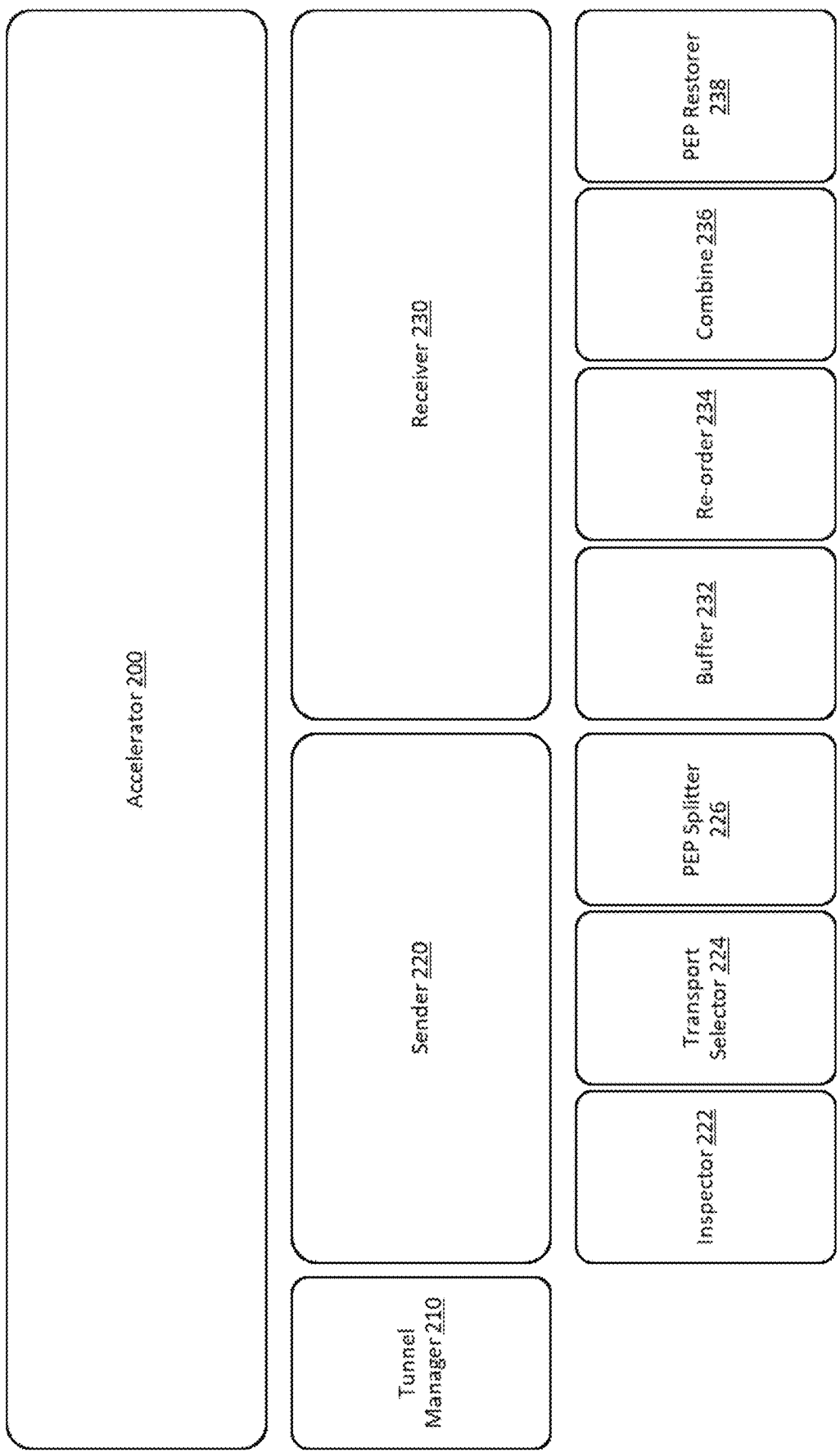
FIG. 2 illustrates an exemplary accelerator according to various embodiments.

FIG. 2 illustrates an exemplary accelerator according to various embodiments.

An accelerator 200 may include a tunnel manager 210, a sender 220 and a receiver 230. The tunnel manager 210 may establish connectivity over the available transports. The tunnel manager 210 may reestablish connectivity when needed as per transport availability. The tunnel manager 210 may monitor performance of the connected transports and reestablish connectivity when needed. The tunnel manager 210 may monitor performance of the peer accelerator being communicated with. The tunnel manager 210 may track various transport metrics for the transports being used by the accelerator 200. The various transport metrics may be used in selecting a preferred transport to convey a packet. Exemplary transport metrics include current latency, congestion, throughput and transport cost for a packet.

In some embodiments, the tunnel manager 210 monitors the WAN transports to determine each WAN transport's status, and to detect packet loss and anomalies. The accelerators may probe and calculate transport characteristics to estimate throughput, latency, and jitter. In some embodiments, a transport selector 224 takes this information into account when determining a packet's transport route. The accelerators may track a private accelerator network status, maintain tunnels to the peer network accelerator or its alternatives. In some embodiments, alternate accelerators may be located at different geographic locations across different servers. When a primary accelerator tunnel drops, the accelerator may immediately handover the traffic to an alternate accelerator. The locations of accelerator networks may be chosen to optimize user service.

The sender 220 may send a packet via the preferred transport. The sender 220 may include an inspector 222, the transport selector 224 and a PEP splitter 226. The inspector 222 may inspect and classify each packet based on its characteristics at the L2/L3/L4 protocol layers. The classification may perform deep packet inspection and/or machine learning to determine an application payload. Classification determines packet QoS. In some embodiments, classification may occur upon reception for improved feedback and adaptation. After the inspection and classification, the inspector 222 may provide classification metrics for the packet. Exemplary classification metrics may indicate whether the packet is, for example, critical application traffic, interactive traffic, bulk traffic, real-time traffic, requiring a quality of service, within a startup period of a traffic floor session, voice traffic or the like. Some examples of common interactive traffic would be TCP session management, TLS handshakes, and DNS lookups. Some examples of common bulk traffic would be file transfers or streaming video. The start-up period can be optimized and customized for varying traffic profiles and end user applications.

The transport selector 224 may apply multiple preferred routing protocols and techniques to determine or select a preferred transport for each packet based on the classification and transport metrics that may be provided by the tunnel manager 210. In some embodiments, the transport selector 224 may direct interactive traffic over the low latency transport (for example, a cellular network, a wireline network) and bulky traffic over a high latency high-throughput network (for example, a high latency satellite network). In some embodiments, the transport selector 224 may initiate a sending of traffic over the low latency transport while queuing up transmission over the satellite transport to hide propagation delay for the same IP flow. The hiding of the propagation delay effectively provides a better user experience. In some embodiments, the transport selector 224 may direct duplication of critical packets over both WAN transports to provide increased redundancy and reliability.

The Performance Enhancing Proxy (PEP) splitter 226 provides termination of an IP flow's original protocol needed to complete the PEP handling of the downstream packet. For TCP this includes terminating the TCP protocol, buffering out of sequence packets and sending acknowledgement.

The receiver 230 may include a buffer 232, a reorder module 234, a combine module 236, and a PEP restore module 238. In some embodiments the receiver 230 performs one or more of the necessary packet buffering with the buffer 232, re-ordering with the reorder module 234, and combining with the combine module 236 prior to routing the packet traffic to a data endpoint. When duplicated packets are received, the receiver 230 performs the necessary packet buffering with the buffer 232, re-ordering with the reorder module 234, and combining with the combine module 236 prior to routing the duplicated traffic. The PEP restore module 238 restores the original protocol and, in particular, is responsible for the retransmission of TCP data segments that are lost between the accelerator and a PEP endpoint.

Figure 3:
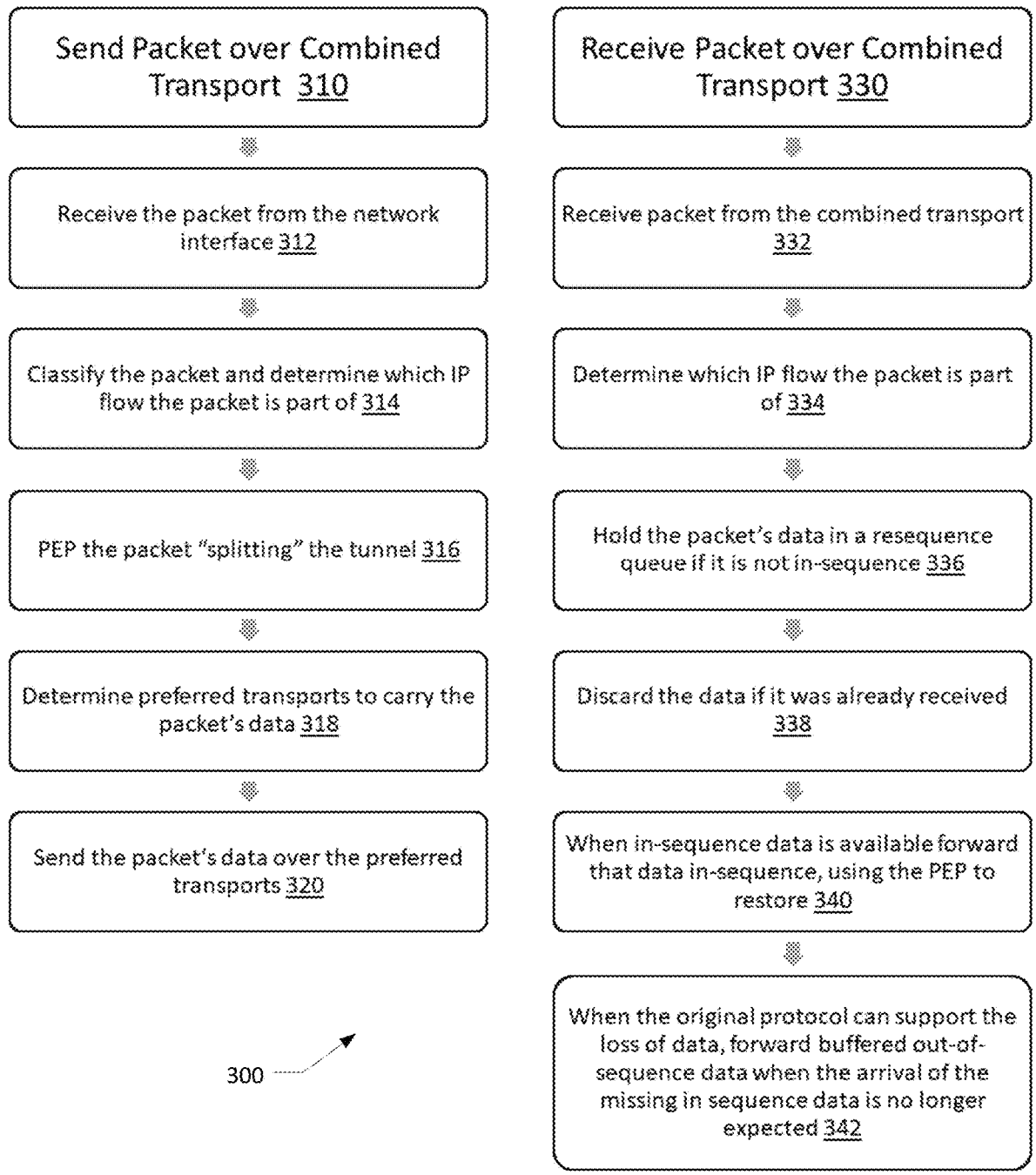
FIG. 3 illustrates a process for accelerating network traffic over multiple transports according to various embodiments.

FIG. 3 illustrates a process for accelerating network traffic over multiple transports according to various embodiments.

A process 300 for accelerating network traffic may include an operation 310 to send a packet over a combined transport and an operation 330 to receive a packet over the combined transport.

Operation 310 may include an operation 312 to receive a packet from a network interface. Operation 310 may include an operation 314 to classify the packet and determine which IP flow the packet is part of. The network interface of operation 312 may be an interface other than the interfaces used to communicate with various WAN transports combined to form the combined transport. Operation 310 may include an operation 316 to PEP the packet by "splitting" the tunnel. Operation 310 may include an operation 318 to determine which WAN transport of the combined transport should carry the packet's data and whether the packet's data should be sent over multiple WAN transports. Operation 310 may include an operation 320 to send the packet's data over the selected WANs in the fashion that is well-suited to the WAN.

Operation 330 may include an operation 332 to receive the packet from one of the WAN transports of the combined transport. Operation 330 may include an operation 334 to determine which IP flow the packet is part of. Operation 330 may include an operation 336 to hold the packet's data if it is not in-sequence in a re-sequence queue. Operation 330 may include an operation 338 to discard the packet data if it was already received. Operation 330 may include an operation 340 to forward the packet data in-sequence when available, using the PEP to restore the flow's original protocol. Operation 330 may include an operation 342 to forward buffered out-of-sequence data when the original protocol can support the loss of data and the arrival of the missing in sequence data is no longer expected (perhaps because of how long the data has been buffered).

Customer Premise Equipment

On the customer premises acceleration of traffic may be provided using a satellite access modem to provide connectivity to a high throughput satellite communications network, a cellular modem (or another low latency transport modem) to provide connectivity to a low latency communication network and an accelerator client to perform the accelerator functions. A customer premise may be the actual customer premise (for example, store or residence), or may be a shared WAN transport facility (for example, a single satellite terminal supporting end-user devices across a campus, small town, or the like). An exemplary CPE 110 is illustrated in FIG. 1. Wireless connectivity is convenient to pair with satellite wireless in areas of minimal ground infrastructure.

In some embodiments, the accelerator client executes on a host processor and OS. The accelerator client may contain multiple instantiations of a client process to establish peer-to-peer tunnel to the accelerator gateway and to perform packet classification for incoming traffic from a customer LAN. The transport server client may be hardware accelerated. The accelerator client may also use machine learning or deep packet inspection to assist with classification. The accelerator client may execute routing and acceleration algorithms. The accelerator client may have a networking stack and/or a security firewall. The entire client or components of the accelerator client may execute in a virtual environment such as a virtual machine or container running on the host.

CPE Configurations

The CPE may be provided as a standalone, transport integrated, hybrid integrated, or fully integrated single device solution. In the standalone configuration all WAN modems and accelerator client are provided as standalone devices. For example, each of the accelerator 112, the satellite modem 114, the cellular modem 116 and the wireline modem 118 may be provided in a standalone device. In the transport integrated configuration, the modems may be integrated into a combined transport modem and the accelerator client may be provided in an external standalone configuration. For example, the satellite modem 114, the cellular modem 116 and the wireline modem 118 may be provided in a standalone device, while the accelerator client provided in a different standalone device. In a fully integrated configuration all modems, router, and accelerator client are integrated together in a single standalone device. Lastly in a hybrid integration, any combination of the above (i.e. 2 modems, router, accelerator client integrated with external $3^{rd}$ WAN transport) may be provided a standalone device. The CPE may include a VPN firewall to support a tunnel between the CPE and the PoP.

Point of Presence (PoP)

The Point of presence (PoP) or Network Operation Center (NOC) is the network side component, for example, the PoP 150 of FIG. 1. Multiple PoPs may be instantiated for load balancing and scaling to load. The location of the PoP may be strategic to optimize transport characteristics such as, latency, jitter, throughput, etc. The PoP may include VPN firewalls to block unwanted intrusion or malicious software/connections. The PoP may serve as an endpoint to additional VPN tunnels. Multiple VPN firewalls may be desired for scalability and load balancing. The PoP may include one or more enterprise routers to route traffic between the accelerator gateway and the public internet. Routers may route traffic to private networks such as network. Multiple routers may exist for scaling and load balancing A PoP may be instantiated on physical hardware or virtualized on a data center or network server. PoP virtualization enables scalability and may lower infrastructure costs. PoPs may also provide other services for management, diagnostics and the like.

Performance Enhancing Proxy (PEP)

Transports, for example, geosynchronous satellite transports, may employ a Performance Enhancing Proxy (PEP) to mitigate the impact of latencies (for example, due to relaying a signal via a satellite) on performance. This is done primarily for the TCP protocol but can be employed with other protocols. With PEP, the accelerator and peer acceleration each split the tunnel by terminating the proxied protocol and then sending the data content in a packet tuned to well-match the WAN's characteristics and reduce, where practical, overhead data such as acknowledgements. PEP may restore the TCP connection at the far end of the WAN so that the original flow(s) of data are delivered unmodified to the two endpoints of the PEP'ed protocol connection. In some embodiments, a split-tunnel PEP is used. In the split-tunnel PEP, the peer accelerator receives a PEP'ed tunnel's upstream data potentially across one or more of the WAN transports in use and restores the original data stream (flow) to deliver it unmodified to the upstream tunnel endpoint. Similarly, the accelerator receives a PEP'ed tunnel's downstream data across potentially both one or more of the WAN transports and restores the original data stream to deliver it unmodified to the downstream tunnel endpoint.

The PEP WAN sender/transmitter handles the transport of the PEP'ed data across the preferred transports where that transmission is tuned to well-match the selected transport's characteristics. In some embodiments this includes one or more of the following:
  (i) reducing the amount of ACK (acknowledgement) transmissions,
  (ii) handling lost packet retransmissions to better match the selected transports characteristics including multiple retransmissions of packets to increase the likelihood that retransmitted packet losses greatly increase effective latency and impact throughput,
  (iii) adjusting flow-control algorithms to avoid the impact of slow start and to match transport available capacity,
  (iv) compressing the data,
  (v) encrypting the data for privacy,
  (vi) blocking small packets into a single large packet to reduce per-packet overhead, and
  (vii) multiplexing multiple PEP'ed IP flows to be carried by a single or smaller number of PEP tunnels.

Peer Accelerator

The peer accelerator resides in a network side component such as a PoP, for example, the peer accelerator 156 and the PoP 150 of FIG. 1. There may be more than one peer accelerator for load balancing, scaling and system redundancy. A location of the peer accelerator may optimize transport characteristics, such as, latency, jitter, throughput, or the like. The peer accelerator acts as the peer to the accelerator. The peer accelerator performs the equivalent of the client functions. The peer accelerator may serve and manage multiple peer accelerator clients.

Management Network

To coordinate each accelerator client and gateway/peer, there may exist a management network, for example, the management network 160 of FIG. 1. The management network may be independent of the PoP or instantiated within the PoP. The management network may be accessible directly through the public internet or PoP. The management network may establish a secure tunnel directly to the management network via a VPN Firewall. The management network may include an Element Management System (EMS) to provision, configure, and manage the accelerator clients and gateways/peers. The management network may include a database for maintaining client and gateway/peer information and diagnostics. The database may store configuration data and logs. The management network may include other services for diagnostics, monitoring, and access permissions. In some embodiments the management network may include a Syslog server, Network Time Protocol (NTP) server, statistics and diagnostics server, or the like.

Multiple management networks can be added to handle system capacity and load. A peer device management client may be included on the CPE. Management traffic may be sent on a selected WAN from a prioritized WAN list. Management traffic may be sent or routed over multiple WANs concurrently.

Scalability & Expansion

The accelerators may support many WANs (2 or more). Additional transports to augment a high latency satellite transport may be used. For example, the wireline network may include a DSL, cable, or fiber network. Network side components including the management network, PoPs, Accelerator Gateways, VPN Firewalls, Routers are scalable.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. An accelerator to provide a combined transport combining Wide-Area Network (WAN) transports, the accelerator comprising:
    a tunnel manager to maintain tunnels traversing each of the WAN transports;
    an inspector to perform packet and IP flow classification to set a respective classification metric for a downstream packet to be sent over the combined transport;
    a transport selector to select a preferred tunnel from the tunnels based on the respective classification metric of the downstream packet; and
    a sender to send the downstream packet over the preferred tunnel,
    wherein the WAN transports comprise a high latency satellite transport and a low latency transport, and a respective tunnel connects the accelerator to a peer accelerator via one of the WAN transports, and
    wherein the accelerator selects, from the tunnels, a tunnel associated with the low latency transport as the preferred tunnel when the respective classification metric indicates a start-up period of bulky traffic, and selects, from the tunnels, a tunnel associated with the high latency satellite transport as the preferred tunnel when the respective classification metric indicates post the start-up period, wherein the start-up period is set to be less than or equal to a round-trip time over the high latency satellite transport.

2. The accelerator of claim 1, further comprising a receiver to receive upstream packets arriving over the combined transport and to forward the upstream packets to a User Equipment.

3. The accelerator of claim 2, wherein the receiver restores an order of the upstream packets when the upstream packets for an Internet Protocol (IP) flow are received out of order.

4. The accelerator of claim 1, wherein the transport selector selects a plurality of the tunnels as the preferred tunnel when the respective classification metric indicates critical application traffic, the sender sends duplicates of the downstream packet over each of the preferred tunnel, and the peer accelerator uses only a first to arrive of the duplicates of the downstream packet.

5. The accelerator of claim 1, wherein the accelerator selects, from the tunnels, a tunnel associated with the low latency transport as the preferred tunnel when the respective classification metric indicates interactive traffic and selects, from the tunnels, a tunnel associated with the high latency satellite transport as the preferred tunnel when the respective classification metric indicates bulky traffic.

6. The accelerator of claim 1, wherein the accelerator selects, from the tunnels, a tunnel associated with the low latency transport as the preferred tunnel when the respective classification metric indicates a start-up of a secure web-browsing session.

7. The accelerator of claim 1, wherein the accelerator selects, from the tunnels, a tunnel associated with the high latency satellite transport as the preferred tunnel when the respective classification metric indicates a high Quality of Service requirement and selects, from the tunnels, a tunnel associated with the low latency transport as the preferred tunnel when the respective classification metric indicates real-time traffic.

8. The accelerator of claim 1, wherein the downstream packet comprises downstream packets and the inspector performs packet and IP flow classification on each of the downstream packets.

9. The accelerator of claim 1, further comprising a Performance Enhancing Proxy (PEP) splitter to terminate an IP flow's original protocol.

10. A system to provide a combined transport combining Wide-Area Network (WAN) transports, the system comprising:
    an accelerator comprising
        a tunnel manager to maintain tunnels traversing each of the WAN transports,
        an inspector to perform packet and IP flow classification to set a respective classification metric for a downstream packet to be sent over the combined transport,
        a transport selector to select a preferred tunnel from the tunnels based on the respective classification metric of the downstream packet, and
        a sender to send the downstream packet over the preferred tunnel; and
    a peer accelerator comprising an instantiation of the accelerator,
    wherein the WAN transports comprise a high latency satellite transport and a low latency transport, and
    wherein a respective tunnel connects the accelerator to the peer accelerator via one of the WAN transports, and
    wherein the accelerator monitors availability of the peer accelerator and updates the combined transport to maintain and use an alternative tunnel to an alternative peer accelerator.

11. The system of claim 10, further comprising a Customer Premises Equipment (CPE) comprising the accelerator connected to a public internet via the peer accelerator.

12. The system of claim 10, further comprising a CPE comprising a satellite modem to provide the high latency satellite transport, a cellular modem to provide the low latency transport, and the accelerator.

13. The system of claim 10, further comprising a Point of Presence comprising the peer accelerator connected to a public internet.

14. The system of claim 10, further comprising a Point of Presence comprising a Virtual Private Network (VPN) firewall, an enterprise router and the peer accelerator wherein the Point of Presence is connected to a public internet.

15. The system of claim 10, further comprising a management network comprising a VPN firewall, a database to store configuration data and logs, an Element Management System (EMS) and a service, wherein the management network is connected to the peer accelerator.

16. The system of claim 10, wherein the preferred tunnel improves a throughput or a latency of transporting a packet between the accelerator to the peer accelerator.

17. The system of claim 10, wherein the accelerator selects, from the tunnels, a tunnel associated with the low latency transport as the preferred tunnel when the respective classification metric indicates a start-up period of bulky traffic, and selects, from the tunnels, a tunnel associated with the high latency satellite transport as the preferred tunnel when the respective classification metric indicates post the start-up period, wherein the start-up period is set to be less than or equal to a round-trip time over the high latency satellite transport.

18. The system of claim 10, wherein the high latency satellite transport comprises multiple high latency satellite transports and the transport selector selects the preferred tunnel to increase redundancy, improve quality of service, and/or increased combined bandwidth.

* * * * *